Patented Mar. 3, 1953

2,630,452

UNITED STATES PATENT OFFICE 2,630,452

BETA-MERCAPTOPROPIONITRILE AND PROCESSES FOR THEIR PREPARATION

Willie W. Crouch and Robert T. Werkman, Bartlesville, Okla., assignors to Phillips Petroleum Company, a corporation of Delaware No Drawing. Original application November 28, 1949, Serial No. 129,866. Divided and this application November 19, 1951, Serial No. 257,196

7 Claims. (Cl. 260—465.1)

1

This invention relates to novel organic sulfur and nitrogen containing compounds, namely, 2-cyanoethyl thiolacetate and beta-mercaptopropionitrile. In one of its aspects, this invention relates to a process for the production of 2-cyanoethyl thiolacetate by reacting thioacetic acid and acrylonitrile in the presence of a basic catalyst. In another of its aspects, this invention relates to a process for hydrolyzing 2-cyanoethyl thiolacetate to produce betamercaptopropionitrile. In yet another of its aspects, this invention relates to a process for reacting thioacetic acid with acrylonitrile in the presence of a catalyst comprising either a quaternary ammonium compound or a tert-butyl hydroperoxide.

This application is a division of our copending application Serial No. 129,866 filed November 28, 1949, for 2-cyanoethyl thiolacetate and beta-mercaptopropionitrile and processes for their preparation. The claims herein are directed to the beta-mercaptopropionitrile and its preparation.

Reactive organic compounds containing divalent sulfur have many important uses as such and also as intermediates in producing other sulfur containing compounds. Thus, these compounds have numerous applications in such fields as rubber vulcanization, modifier in emulsion polymerization recipes forming synthetic rubber, lubricating oil additives, medicine, ore flotation, dye production, etc.

According to this invention, there have been prepared novel organic sulfur and nitrogen containing compounds, namely, 2-cyanoethyl thiolacetate and beta-mercaptopropionitrile. Still according to this invention, there has been set forth a process for the production of 2-cyanoethyl thiolacetate by the reaction of thioacetic acid and acrylonitrile in the presence of a basic catalyst without any substantial concomitant hydrolysis of the nitrile radical and without undesirable polymerization of the acrylonitrile reactant. Still further according to this invention, it has been found that 2-cyanoethyl thiolacetate can be hydrolyzed to beta-mercaptopropionitrile in excellent yields without any substantial decomposition of the nitrile radical to a corresponding acid.

Thus, according to this invention, thioacetic acid and acrylonitrile are reacted to yield a novel compound, 2-cyanoethyl thiolacetate. The reaction can be illustrated by the following equation:

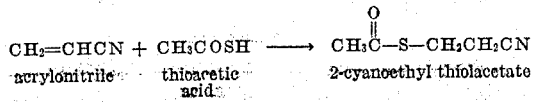

2

The best yields of the thiolacetate product have been obtained when approximately equi-molar proportions of the reactants are employed. However, such proportion of the reactants is not necessary and if other proportions are employed, it is preferable to use a greater molar quantity of the thioacetic acid than of the acrylonitrile. The reaction is one of addition and is highly exothermic in nature. Accordingly, the rate of reaction must be carefully controlled to avoid excessively high reaction temperatures which result in polymerization of the acrylonitrile to form acrylic polymers and resins. Usually one of the reactants is added to the other at a slow rate so that sufficient time is allowed for dissipation or removal of the exothermic heat of reaction either by radiation or by suitable cooling coils. Upon completion of the reaction, the 2-cyanoethyl thiolacetate product can be readily separated from unreacted materials by simple fractional distillation.

As stated, the temperature of the thioacetic acid-acrylonitrile addition reaction is maintained within a range sufficiently low to prevent any substantial polymerization of the acrylonitrile and to prevent decomposition of the thiolacetate product. As a general rule, a temperature in the range of 10° to 150° C., preferably from 25° to 95° C., still more preferably from 30° to 75° C., is satisfactory. The exact temperature to be employed depends on the efficiency of the catalyst employed, the purity of the reactants and upon the desired overall yield of product. In any event, the optimum temperature can be determined by mere routine test.

The pressure to be employed in the addition reaction is not critical and can range from substantially atmospheric to 10 atmospheres or even higher. A pressure sufficiently high to maintain liquid phase reaction conditions is preferred.

In accomplishing the thioacetic acid-acrylonitrile reaction, it has been found to be highly advantageous to employ certain basic catalysts as reaction promoters and directors. The preferred catalyst is a quaternary ammonium compound, designated by the general formula

wherein $R_1$, $R_2$, $R_3$ are alkyl groups selected from the class containing from one to six carbon atoms, e. g. methyl, ethyl, propyl, etc., and $R_4$ is either another alkyl group selected from the same class as $R_1$, $R_2$, and $R_3$ or an aralkyl, alkaryl, or aryl group selected from the class of phenyl, benzyl, tolyl, etc. A particularly preferred catalyst is trimethylbenzyl ammonium hydroxide although other catalysts such as dimethylethylbenzyl ammonium hydroxide, methyldiethylbenzyl ammonium hydroxide, etc. are satisfactory. Another catalyst which has been found to be effective is tert-butyl hydroperoxide although it is usually preferable to employ a quaternary ammonium compound. As a general rule, it has been found necessary to employ only very small concentrations of the selected catalyst in order to effectively promote and direct the addition of the reactants. Thus, from about 0.1 to 5, preferably from 0.5 to 2, parts by weight of the catalyst per 100 parts by weight of the thioacetic acid reactant are employed. The use of an insufficient concentration of catalyst results in the formation of polymers of the acrylonitrile reactant with a resultant decrease in overall efficiency of the process and plugging of the reaction equipment with the polymers.

The 2-cyanoethyl thiolacetate produced in accordance with the process of this invention is a clear, pale yellow liquid at room temperature. It has a very disagreeable odor. Other properties of the compound are:

Boiling point at
   3mm. Hg. absolute pressure_____°C__   94
Density, $d\frac{20}{4}$ ---------------------------------- 1.1212
Refractive index, $n\frac{20}{d}$ -------------------- 1.4912

As stated, this compound is valuable as an intermediate in organic syntheses inasmuch as it exhibits reactivity not only through the divalent sulfur but also through the nitrile and the carbonyl groups. Hence, many derivatives can be prepared from this compound by utilizing reactions characteristic of these three reactive groups.

In accordance with this invention, the novel 2-cyanoethyl thiolacetate prepared by the above-described process can be hydrolyzed to yield another novel compound, beta-mercaptopropionitrile. Thus, the hydrolysis reaction is as follows:

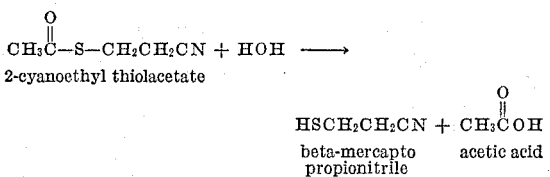

The hydrolysis reaction is preferably performed in the presence of a basic material, e. g. an alkali metal hydroxide such as sodium or potassium hydroxide, dissolved in sufficient water to yield a 5 to 30, preferably a 10 to 15 weight per cent solution. The hydrolysis of the thiolacetate is accomplished at a temperature between 2° and 40° C., preferably between 10° and 25° C. The hydrolysis reaction is readily controllable since the 2-cyanoethyl thiolacetate is not soluble in aqueous alkali while its hydrolysis product is soluble therein.

The hydrolysis of the 2-cyanoethyl thiolacetate is usually quite rapid. Thus, a given weight of the thiolacetate is substantially completely hydrolyzed by 0.5 to 2, preferably 0.7 to 1.5, parts by weight of a 5 to 20, preferably a 10 to 15 weight per cent solution of an alkali per part of ester to be hydrolyzed, within a period of time as short as 15 minutes. The alkali which is employed can be sodium, potassium, or lithium hydroxide, etc.

After the hydrolysis reaction, the beta-mercaptopropionitrile product is separated from the remaining aqueous solution of basic material by acidifying the solution with an inorganic acid such as sulfuric, hydrochloric, etc., to a pH between 4.5 and 6.0. The acidified solution then separates into an oily phase and an aqueous phase. The nitrile can be recovered and purified in any suitable manner. For example the water phase can be extracted with ether to extract the last traces of oil. The beta-mercaptopropionitrile can then be readily recovered from the combined oil and ether extract phases as a substantially pure product by simple distillation. If desired the ether may be separated from the ether extract phase and the oil combined with the separated oil phase. The product is a water-white liquid having a disagreeable odor as well as the following properties:

Boiling Point at
   15 mm. Hg., absolute pressure_____°C__   75
Density, $d\frac{20}{4}$ ---------------------------- 1.0696
Refractive index $n\frac{20}{d}$ -------------------- 1.4877

This compound is useful as an organic intermediate and a modifier in emulsion polymerization recipes forming synthetic rubber since it exhibits reactivities characteristic of the mercapto and the nitrile groups.

The following examples will serve to still more fully demonstrate the process and products of this invention. However, it is apparent that one skilled in the art, having possessed the foregoing description of the invention, can readily practice the process of the invention to produce the products thereof without necessarily resorting to the following examples.

*Example I*

Two hundred grams of thioacetic acid was slowly added to 142 grams to acrylonitrile containing one milliliter of trimethylbenzyl ammonium hydroxide catalyst. The mixture was stirred continuously and was initially warmed to a temperature of 38° C. The acid was added over a period of two hours. The exothermic heat of reaction maintained the temperature between 38° C. and 105° C. during this period.

Distillation of the reaction product yielded 300.5 grams of 2-cyanoethyl thiolacetate. This represents a yield of distilled product of 88.6 per cent of theory based on thioacetic acid.

*Example II*

Hydrolysis of a 77.3 gram sample of the 2-cyanoethyl thiolacetate produced in Example I was effected with 80 grams of a 12 weight per cent aqueous sodium hydroxide solution. The mixture was stirred during the hydrolysis and was maintained below 32° C. (but above 0° C.) by means of an ice bath. Within 15 minutes the ester was completely dissolved in the caustic solution. The mixture was then acidified to pH 5 and an oily layer separated from the water phase. Two 100 milliliter portions of ether were used to extract last traces of oil from the water phase. The oil phase and ether extract were combined and distilled to yield 37 grams of beta-mercaptopropionitrile. This is equivalent to 71 per cent of theoretical conversion based on the amount of 2-cyanoethyl thiolacetate used.

*Example III*

Five-tenths milliliter of trimethylbenzyl ammonium hydroxide catalyst was admixed with 51.4 grams of acrylonitrile. Then 28.2 grams of thioacetic acid was quickly added with stirring to the acrylonitrile-catalyst mixture. The temperature rose rapidly to 74° C. An additional 46 grams of thioacetic acid was added at a rate such that the temperature in the reaction vessel was maintained at 65° to 71° C. About one hour was required to add the additional 46 grams of acid. The reaction mixture was then stirred for an additional one hour period.

The product was distilled and 108 grams of 2-cyanoethyl thiolacetate was recovered. This represents an actual yield of pure product amounting to 86.3 per cent of the theoretical yield based on acrylonitrile.

*Example IV*

Thirty-three point six grams of acrylonitrile containing one weight per cent tert-butyl hydroperoxide catalyst was added dropwise to 39 grams of thioacetic acid. The reaction mixture was heated to 43° to 49° C. and stirred throughout the run. About two hours were required to add the acrylonitrile.

The product was distilled and 19 grams of 2-cyanoethyl thiolacetate was recovered. This represents an actual yield of pure product amounting to 28.7 per cent of the theoretical yield based on thioacetic acid.

Reasonable variation and modification are possible within the scope of the foregoing disclosure and the appended claims to the invention the essence of which is that thioacetic acid and acrylonitrile can be reacted in the presence of a basic catalyst to produce a novel compound, 2-cyanoethyl thiolacetate, without polymerizing the acrylonitrile reactant and that the 2-cyanoethyl thiolacetate thus formed can be hydrolyzed by a cold basic solution to yield still another novel compound, beta-mercaptopropionitrile, without concomitant hydrolysis of the nitrile radical of the last said compound.

We claim:

1. Beta-mercaptopropionitrile.
2. A process for producing beta-mercaptopropionitrile comprising contacting 2-cyanoethyl thiolacetate with an aqueous solution of an alkali metal hydroxide.
3. A process for producing beta-mercaptopropionitrile comprising contacting 2-cyanoethyl thiolacetate with an aqueous solution of an alkali metal hydroxide at a temperature between 25° and 40° C.
4. The process of claim 2 wherein the alkali metal hydroxide is sodium hydroxide.
5. A process for producing beta-mercaptopropionitrile comprising reacting thioacetic acid with acrylonitrile in the presence of a catalyst to form 2-cyanoethyl thiolacetate, hydrolyzing the said 2-cyanoethyl thiolacetate with a cold aqueous solution of an alkali metal hydroxide to form the desired beta-mercaptopropionitrile.
6. The process of claim 5 wherein the said catalyst is trimethylbenzyl ammonium hydroxide.
7. A process for producing beta-mercaptopropionitrile comprising reacting acrylonitrile with thioacetic acid in the presence of small amounts of trimethylbenzyl ammonium hydroxide at a temperature between 38° and 105° C., recovering the thus produced 2-cyanoethyl thiolacetate, hydrolyzing the said 2-cyanoethyl thiolacetate with an aqueous solution of sodium hydroxide at a temperature between 0° and 32° C., acidifying the thus resulting mixture of beta-mercaptopropionitrile and aqueous sodium hydroxide, and separating the beta-mercaptopropionitrile from the acidified solution by ether extraction and distillation.

WILLIE W. CROUCH.
ROBERT T. WERKMAN.

No references cited.